J. W. Hollingsworth,
Cage Trap,
N° 64,869. Patented May 21, 1867.

Witnesses: Theo Tusch, J. A. Service

Inventor: Jno. W. Hollingsworth

United States Patent Office.

J. W. HOLLINGSWORTH, OF SALEM, INDIANA.

Letters Patent No. 64,869, dated May 21, 1867.

IMPROVEMENT IN ANIMAL TRAPS.

The Schedule referred to in these Letters Patent and making part of the same.

TO ALL WHOM IT MAY CONCERN:

Be it known that I, JOHN W. HOLLINGSWORTH, of Salem, in the county of Washington, and State of Indiana, have invented a new and useful Improvement in Animal Trap; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to improve the construction of my animal trap patented October 16, 1866; and it consists, first, in the combination of the wings, connecting-rods, and double crank with the eccentric-shaft and with the frame of the trap; second, in the combination of the rocking-plate, levers, spring, and catch with the eccentric and frame of the trap; and, third, in the combination of the catch with the lift-gate and eccentric; the whole being constructed and arranged substantially as herein shown and described.

Figure 1:
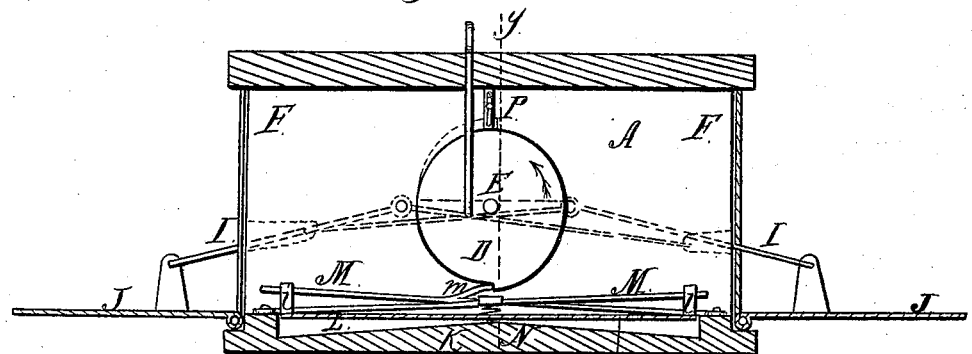
Figure 1 is a vertical cross-section of my improved trap taken through the line $x\ x$, fig. 2.
Figure 3:
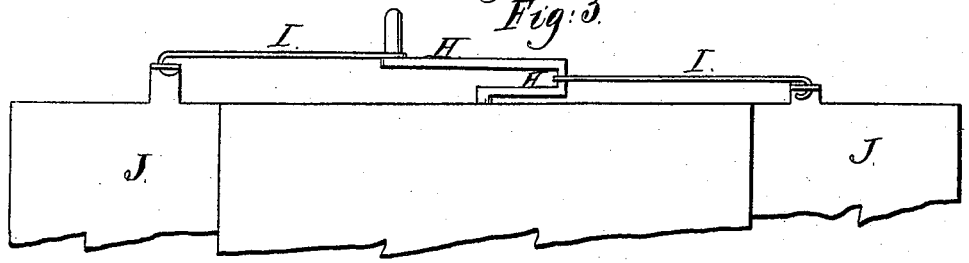
Figure 3 is a top view of a portion of the trap showing the arrangement of the crank and connecting-rods.
Figure 2:
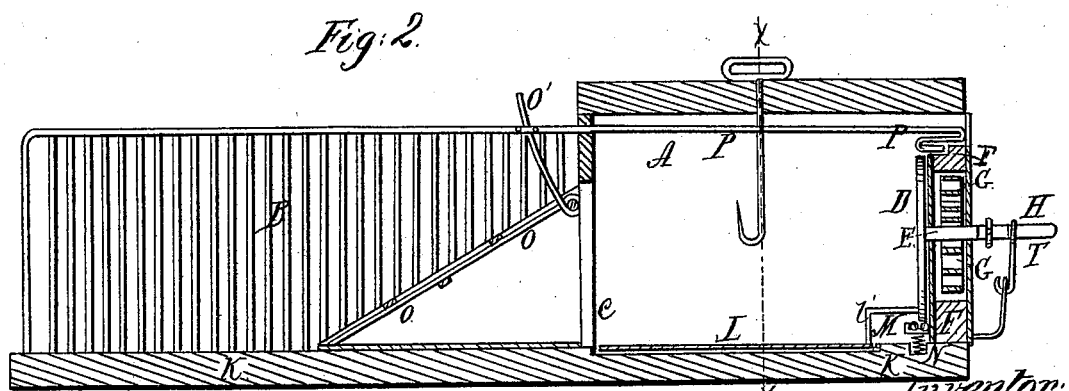
Figure 2 is a vertical longitudinal section of the same taken through the line $y\ y$, fig. 1.

The trap is divided into two parts, A and B, by the partition C, which has a hole through it, through which the animals may pass from the part A to the part B. D is the eccentric which is securely attached to the end of the shaft E, which passes out through the end F of the trap. G is a spring let into the end board F of the trap, and which is attached to and coiled around the shaft E. To the outer end of the shaft E is attached, or upon it is formed, a double crank, H, to which the ends of the connecting-rods I are pivoted. The other ends of the rods I are pivoted to ears formed upon the edges of the wings J, as shown in figs. 1 and 3. The wings J are pivoted to the edges of the bottom K of the trap, as shown in fig. 1, and when they are erect in the position shown in red in fig. 1, no light can enter the compartment A except what comes through the opening through the partition C. L is the rocking-plate, which is pivoted at its middle part to the bottom K of the trap, the said bottom being partially cut away beneath it, as shown in fig. 1. M are levers, one end of each of which is pivoted to the bottom K, as shown in fig. 1, and their other ends pass under ears $l'$ formed upon or attached to the edge of the plate L. The middle parts of the levers M rest upon the upper end of a coiled wire spring, N, the other end of which is secured in a hole formed in the bottom K for its reception, as shown in figs. 1 and 2. Upon one or both the levers M is formed a stop, $m^1$, which catches upon the shoulder of the eccentric D. When either side of the plate L is depressed by the animal stepping upon it, the levers M are drawn down, releasing the eccentric from the catch $m^1$. The spring G immediately revolves the eccentric D, which operates the double crank H, and raises the wings J, which, as they rise, project the animal into the compartment A. The animal now sees a light shining through the opening in the partition C, and rushes toward it, lifting the lift-gate O and passing into the compartment B. The upper part of the lift-gate O, or an arm $o'$ formed upon or attached to said gate, is connected to the end of the bar of the catch P and operates it. The other end of the bar or rod P has a catch formed upon it, which performs a double office. When the parts of the trap are in the position shown in fig. 2, and in black lines in fig. 1, the catch P drops down into a notch in the end board F of the trap, as shown in fig. 2, and prevents the lift-gate O from being raised, but when the trap has been sprung, the revolution of the eccentric D raises the catch P out of its notch, so that the said lift-gate can be raised or opened. At the same time the shoulder of the said eccentric catches upon the catch P and holds the wings J in an erect position. The animal lifting the gate O to pass through pushes the catch P away from the shoulder of the eccentric D, when the spring G again revolves the eccentric and sets the trap.

What I claim as new, and desire to secure by Letters Patent, is—

1. The shaft E, bearing the spring G, eccentric D, and double crank H, to which are connected the rods I, pivoted to wings J, in combination with the rocking-plate L, supporting the pivoted levers M, provided with stops $m^3$, constructed and operating in the manner and for the purpose specified.

2. The stops $m^3$, in combination with the levers M, pivoted to the rocking-plate L, arranged relatively with the shouldered eccentric D, operating substantially as described for the purpose specified.

3. The rod P, provided at one end with a catch fitting into notch in the end board F, and connected at the other end by rod $o'$ to the lift-gate O, operated by the shouldered eccentric D, and arranged relatively with the working parts of the trap herein described, substantially as and for the purpose specified.

J. W. HOLLINGSWORTH.

Witnesses:
AMOS FROST,
P. L. CARTER.